May 8, 1962   G. A. WOOD, JR   3,033,486
RECIPROCATING DRIVE MECHANISM FOR SPINNING REEL
Filed May 6, 1959   2 Sheets-Sheet 1

INVENTOR.
Garfield A. Wood, Jr.
BY
Harness, Dickey & Pierce
ATTORNEYS

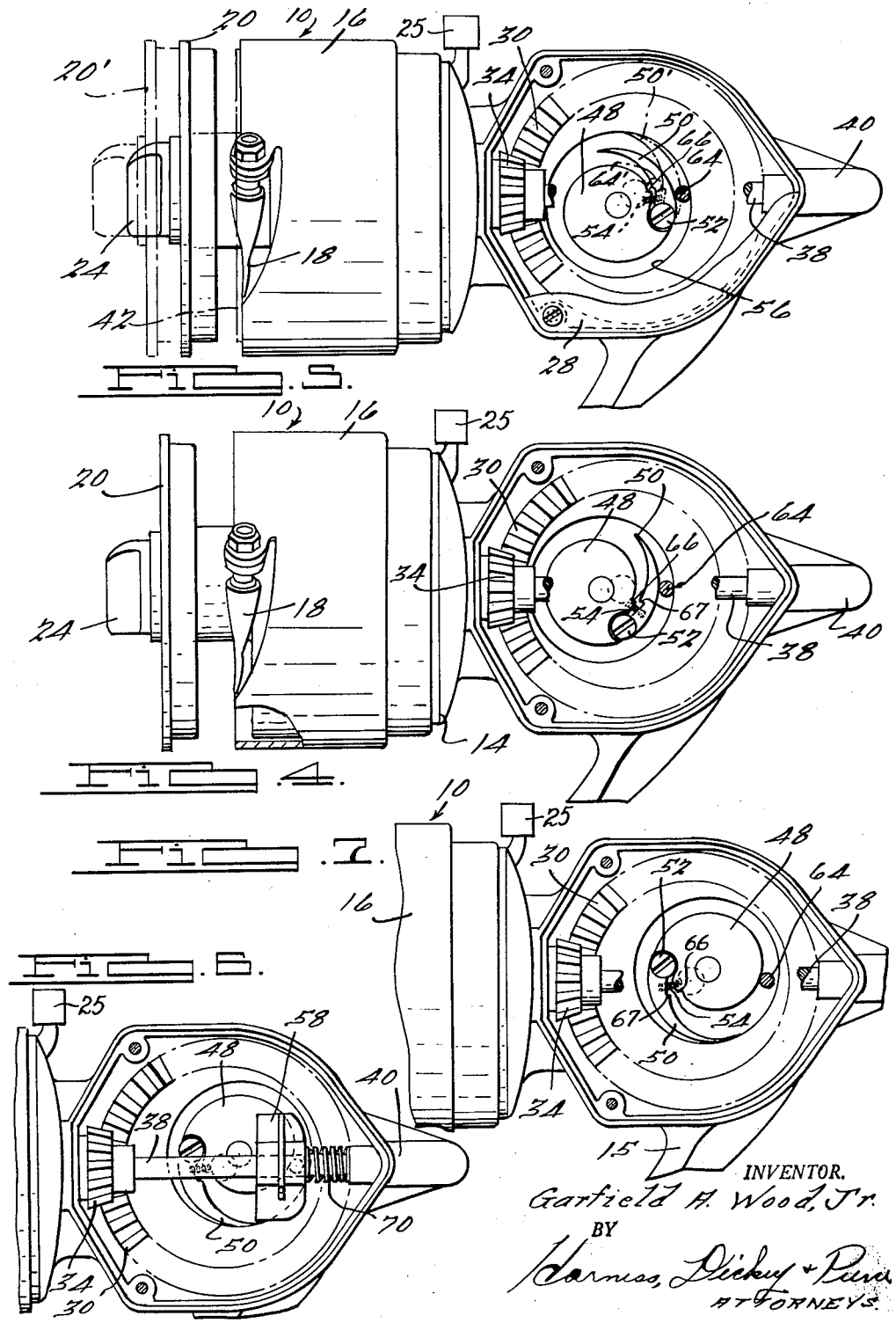

United States Patent Office 3,033,486
Patented May 8, 1962

3,033,486
RECIPROCATING DRIVE MECHANISM
FOR SPINNING REEL
Garfield A. Wood, Jr., 4565 Sable Palm Road,
Bay Pointe, Miami, Fla.
Filed May 6, 1959, Ser. No. 811,409
5 Claims. (Cl. 242—84.21)

This invention relates to spinning reels and particularly to an improved drive mechanism for rotating and reciprocating an open face spinning reel.

The present invention represents an improvement over my copending application, Serial Number 677,427, filed on August 12, 1957, which also discloses and claims an open faced spinning reel having the finger rotated relative to a spool that reciprocates relative to the finger, the reciprocation being provided by what may aptly be designated as a shaper mechanism; i.e., a crank arm having one end eccentrically pinned to the face of a rotating gear. However, in the reel of my copending application the spool is reciprocated through the same predetermined distance both when the finger is winding the line on the spool, and when it is rotated in reverse to retract it to its casting position.

When in this retracted, casting position, it has been found that the finger will occasionally re-engage the line as the line loosely unwinds from the spool when a cast is made. Of course, should the finger re-engage or hook the line in this manner, it would prevent the line from freely unwinding from the spool, and thus foul the cast.

It is one object of the present invention to eliminate the possibility of the finger re-engaging or hooking the line when it is retracted to casting position and a cast is made.

It is another object of the invention to provide a drive mechanism that will retract the finger relative to the spool a greater distance when the finger is rotated in reverse to its casting position than when it is rotated in the opposite direction to wind the fishing line on the spool, and thus ensure that the finger is completely out of the way of the fishing line when in its casting position.

It is a further object of the invention to provide a drive mechanism for rotating the finger of a spinning reel relative to the spool and reciprocating the spool relative to the finger that is simple and economical in design, rugged and durable in construction, and reliable and smooth in operation.

Other objects and features of novelty of the invention will be specifically pointed out or otherwise become apparent when referring, for a better understanding of the invention, to the following description taken in conjunction with the accompanying drawings wherein:

FIG. 4 is a view similar to that of FIG. 2 with a portion of the reciprocating shaft of the drive mechanism broken away to more clearly illustrate the position of the drive mechanism when the spool is reciprocated to its outermost position;

FIG. 5 is a view similar to that of FIG. 4 illustrating positions of the drive mechanism when the direction of rotation of the finger of the spinnng reel is reversed;

FIG. 6 is a fragmentary view of a portion of the spinning reel illustrated in FIG. 2 illustrating a modification of the present invention; and FIG. 7 is a fragmentary view similar to that of FIG. 6 with a portion of the reciprocating shaft removed to more clearly illustrate the drive mechanism.

Figure 1:
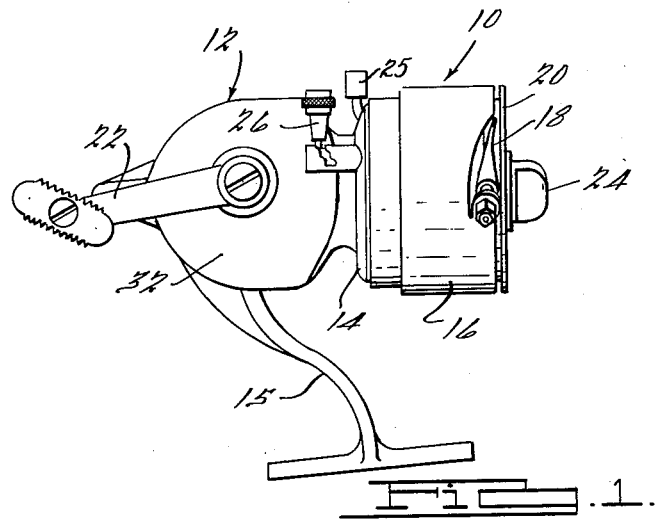
FIGURE 1 is a side elevational view of a spinning reel embodying features of the present invention.

Referring to FIG. 1, an open-faced spinning reel 10 is illustrated which is similar to the spinning reel described and claimed in my aforementioned copending application. The spinning reel 10 is comprised of a housing 12 having a flat circular portion 14 on one end thereof, and a bracket 15 extending downwardly therefrom for mounting the spinning reel 10 on a fishing rod. A tubular body 16 having a rigid finger 18 affixed thereto is rotatably mounted on the circular portion 14 of the housing 12, and a spool 20 is slidably mounted on the circular portion 14 within the tubular body 16. It might also be noted that the circular portion 14 of the body 12 lies in a plane substantially perpendicuar to the axis of rotation of the tubular body 16. In response to the rotation of a handle 22 rotatably mounted on the housing 12, the spool reciprocates between the positions illustrated in FIGS. 1 and 4 and the finger 18 rotates about the spool to wind a fishing line evenly thereon.

A brake adjusting knob 24 is secured to the spool 20 for adjusting the braking pressure of the spool, and an anti-reverse and clicking mechanism operated to off and on positions by a lever 25 is mounted on the circular portion 14 for engaging the tubular body 16 to prevent rotation thereof in one direction and to provide a clicking noise when the tubular body is rotated in the opposite direction. Of course the anti-reverse mechanism 25 can be moved out of engagement with the tubular body to enable it to be rotated in said one direction to the casting position to be described. Each of the aforementioned elements and their operation is described in detail in my copending application and since they merely relate to the environment of the present invention they will not be described in greater detail herein.

Figure 2:
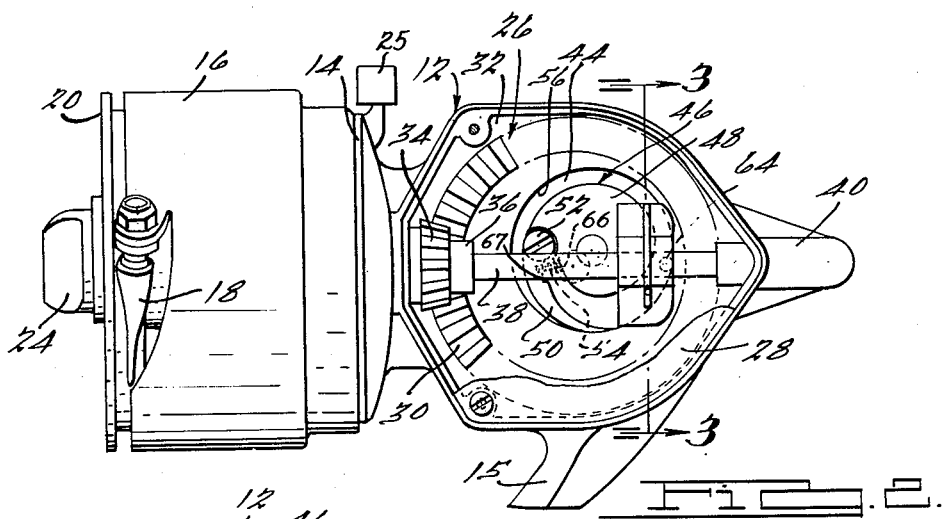
FIG. 2 is an enlarged, broken, side elevational view of the opposite side of the spinning reel illustrated in FIG. 1 with a portion of the housing cover thereof broken away to more clearly illustrate the drive mechanism within the housing.

Referring to FIG. 2, a drive mechanism 26 embodying features of the present invention is illustrated for rotating the tubular body 16 and reciprocating the spool 20. The drive mechanism is disposed within the housing 12 and is adapted to be enclosed by a cover 28 forming one side of the housing 12 but broken away in FIG. 2 to more clearly illustrate the drive mechanism. The drive mechanism is comprised of a relatively large bevel gear 30 rotatably mounted on a wall 32 of the housing 12 and connected to the handle 22 for rotation thereby. The bevel gear 30 meshes with and drives a smaller bevel gear 34 rotatably mounted on the circular portion 14 of the housing in a suitable manner, such as by a hollow stub shaft 36 journalled in the circular portion 14 and having the other end thereof secured to the tubular body 16 to rotate the tubular body in either direction in response to the direction of rotation of the gear 34.

A shaft 38 extends across the diameter of the bevel gear 30 and has the right end thereof slidably disposed within a bore in a projecting portion 40 projecting from the right end of the housing 12 as viewed in FIG. 2. The left end of the shaft 38 (not shown) slidably extends through the hollow stub shaft 36 in a manner to permit the shaft 38 to reciprocate relative to the stub shaft 36 and to permit the stub shaft to rotate relative to the shaft 38, and the spool 20 is mounted on the left end of the shaft 38 for reciprocation therewith and rotation relative thereto. As described in my copending application, a suitable brake mechanism adjusted by the knob 24 is provided for preventing rotation of the spool 20 relative to the shaft 38 unless a sufficient force is exerted thereon by a fighting fish, for example. Should this occur the spool will slip against the frictional resistance of the brake to prevent breaking of the fishing line.

With this construction, the handle 22 is drivingly connected to the tubular body 16 by the gears 30 and 34, and when the gear 30 is rotated in a clockwise direction by the handle as viewed in FIG. 2, the tubular body and finger 18 rotate to wind a fishing line (not shown) on the spool 20. At the same time reciprocation of the shaft 38 by the drive mechanism 26, as will be described, reciprocates the spool 20 relative to the rotation finger 18 between the positions illustrated in FIGS. 2 and 4 to ensure that the fishing line is evenly distributed on the spool.

As described in my copending application, the finger 18 is disengaged from the fishing line and moves the casting position by reversing the direction of rotation of the handle 22 to rotate the finger 18 in the reverse direction relative to the spool, which of course permits the fishing line to slide off the end of the finger. As further taught in my copending application, this reverse rotation of the finger 18 is continued until the finger occupies the approximate position illustrated in FIG. 4 relative to the spool 20, at which point the reverse rotation of the finger is stopped. In this position, with the fishing line disengaged from the finger by the reverse rotation of the finger, a cast can be made since the fishing line will freely pay off the spool in an axial direction. However, it was found that as the fishing line loosely moved off the spool, it occasionally caught on the end of the finger 18 and interrupted the casting operation.

The drive mechanism 26 of the present invention completely overcomes this problem by reciprocating the spool 20 outwardly a greater distance to the position illustrated by the dotted and dashed lines of FIG. 5 when the finger is rotated to its casting position. In this position the end of the finger 18 closely overlies a lower flange 42 of the spool 20 to completely prevent the possibility of the fishing line accidentally catching on the end of the finger when a cast is made. The manner in which the spool can be moved outwardly this additional distance and still reciprocate between the positions of FIGS. 2 and 4 when the finger is rotated in the opposite direction to wind the fishing line of the spool will be more readily understood from the following description of the operation of the drive mechanism 26 and the manner in which it reciprocates the shaft 38.

The face of the bevel gear 30 is provided with a disk-shaped recess 44, the center of which is offset from the axis of rotation of the bevel gear. A flat disk element 46 having a smaller diameter than the diameter of the recess 44 is concentrically disposed within the recess and is comprised of a fixed portion 48 and a curved finger portion 50 having one end thereof pivotally mounted on the gear 30 in any suitable manner, such as by a screw 52. The curved finger 50 is similar in shape to a curved dagger tapering to a pointed end, and can pivot in a counterclockwise direction from the position illustrated in FIG. 2 to its closed position wherein, together with the fixed portion 48, it forms the circular disk element 46. A suitable spring 54 or the like is provided for resiliently biasing the curved finger 50 to the position illustrated in FIG. 1 wherein the pivoting end thereof engages an annular shoulder 56 of the disk-shaped recess 44.

Figure 3:
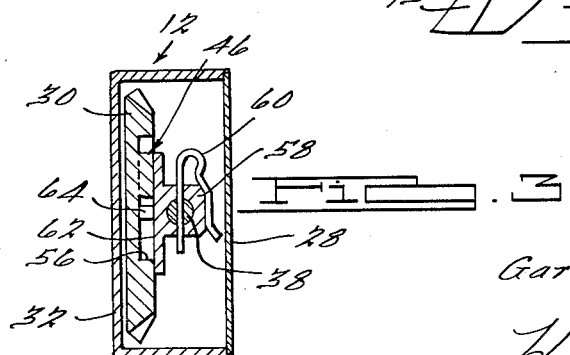
FIG. 3 is a sectional view of the structure illustrated in FIG. 2 taken along the line 3—3 thereof.

Referring to FIG. 3 as well as FIG. 2, a guide member 58 is disposed over the shaft 38 and fixed thereto in any suitable manner such as by a cotter pin 60. Lower face 62 of the guide member slides on the face of the bevel gear 30 and the disk assembly 46 and has a pin 64 projecting therefrom into the annular groove defined by the disk assembly 46 and the annular shoulder 56 of the disk-shaped recess.

In operation, assuming that the bevel gear 30 is being rotated in a clockwise direction as viewed in FIGS. 2 and 4 to rotate the finger 18 about the spool 20 in a manner to wind the fishing line on the spool, the spool will be retracted within the tubular body 16 when the pin 64 is in the position illustrated in FIG. 2, and, as the gear 30 rotates in the clockwise direction the pin 64 will be cammed upwardly by the annular shoulder 56 to the position illustrated in FIG. 4. In this position it is apparent that the upward movement of the pin means will move the shaft 38 upwardly which, in turn, projects the spool 20 outwardly of the tubular body 16 as illustrated, and the pin means is also free to move past the curved finger by compressing the spring 54. As the gear 30 continues to rotate the pin 64 will ride on the curved finger 50 and thereafter on the periphery of the fixed portion 48 so that it is moved downwardly to the position illustrated in FIG. 2, after which it will again be moved upwardly as previously described. In this manner, due to the eccentric position of the recess 44 and disk assembly 46, the pin 64 will reciprocate the shaft 38 along a line parallel to the plane of rotation of the gear 30 to reciprocate the spool 20 between the positions illustrated in FIGS 2 and 4. At the same time the bevel gears 30 and 34 continuously rotate the tubular body 16 and finger 18 about the reciprocating spool to wind the fishing line evenly thereon.

To move the spool 20 outwardly a greater distance to the casting position 20' illustrated in dotted and dashed lines in FIG. 5 wherein the end of the finger 18 overlies the flange 42, the gear 30 is rotated in a counterclockwise direction by the handle 22. Referring to FIG. 5, the pin 64 will ride on the periphery of the stationary portion 48 so as to be moved downwardly to retract the spool 20 to the position illustrated in FIG. 2, at which point continued rotation of the gear 30 in the counterclockwise direction will bring the annular shoulder 56 into engagement with the pin 64 to reverse the direction of the pin and begin to move it and the spool 20 outwardly of the tubular body 16. Shortly after the direction of movement of the spool is reversed and it begins to move outwardly of the tubular body, the pin 64 will approach the tip of the curved finger 50 which would be in the dotted position 50' illustrated in dotted and dashed lines since the spring 54 normally urges the finger to this position. Continued counterclockwise rotation of the gear 30 will cause the pin 64 to ride onto the inner edge of the curved finger 50 to the position illustrated in phantom and indicated by the numeral 64' wherein it abuts against a generally radially extending shoulder 66 formed on the fixed portion 48 of the disk assembly 46 to prevent further rotation of the gear 30 in the counterclockwise direction. The shoulder 66 of course provides a solid stop that can be engaged by the pin 64 in a manner that does not tend to wedge the pin tightly between the finger 50 and fixed portion 48. A shoulder 67 is also formed in the finger 50 to overlap the shoulder 66 when the finger is closed in order to eliminate interference between the finger and shoulder 66 and to ensure that the pin 64 is properly guided against the shoulder 66 in the casting position.

When the pin 64 is in the position indicated in phantom by the numeral 64', the spool 20 will of course be advanced to the position 20' illustrated in dotted and dashed lines wherein it projects outwardly from the tubular body 16 a greater distance than its maximum projection therefrom during the winding of the fishing line on the spool. This greater distance is substantially equal to the distance between the pin 64 and its phantom position indicated by the numeral 64', and when in this position of maximum outward projection from the tubular body 16, the end of the finger 18 will of course overlie the lower flange 42 of the spool as previously described so that the fishing line cannot possibly engage the end of the finger as the line is cast out in an axial direction. In this manner the present invention completely eliminates the possibility of the fishing line hooking on the finger 18 as might occur in my copending application wherein the finger can only be retracted to the approximate position illustrated in FIG. 4 when moved to its casting position.

Of course to wind the fishing line on the spool, the gear 30 need only be rotated in a clockwise direction by the handle 22 which will move the pin 64 out of its position 64' between the finger 50 and fixed portion 48, after which it is free to continuously rotate around the annular groove and ratchet past the finger 50, as illustrated in FIG. 4, to reciprocate the spool 20 between the positions illustrated in FIGS. 2 and 4. When rotated in this direction the finger will hook the line and evenly distribute it on the reciprocating spool.

To ensure that the pin 64 can smoothly ride over the tip of the finger 50 and in to the inner edge thereof to the position indicated by the numeral 64' of FIG. 5, the outer edge of the pivoting end of the finger 50 is preferably formed with a radius of curvature equal to the radius of curvature of the annular shoulder 56.

Alternatively, the curved finger 50 can have its outer edge formed with the same radius of curvature as the main periphery of the fixed portion 48 so that when the finger is in its closed position, with its inner edge engaging the periphery of the fixed portion, the periphery of the disk assembly will define a substantially true circle, and the portion of the annular shoulder 56 engaged by the pivoting end of the finger when in the position illustrated in FIG. 2 can be relieved with a radius of curvature equal to the radius of curvature of the disk assembly. In either of these two alternatives the end of the finger 50 will lie flush against the annular shoulder 56 so that the pin 64 can smoothly ride thereover when the bevel gear is rotated in a counterclockwise direction.

Referring to FIGS. 6 and 7, a modification of the invention is illustrated wherein a coil spring 70 or the like is disposed over the shaft 38 between the guide element 58 and the inner end of the projecting portion 40 to normally urge the guide element 58 and pin 64 to the left when the spool is at or near its retracted position relative to the tubular body 16. By providing the spring 70 the pin 64 is placed in contact with the periphery of the fixed portion 48 of the disk assembly 46 rather than the annular shoulder 56 near the point where the pin would normally pass over the end of the finger 50 as previously described. Consequently, when the spring 70 is provided, the outer edge of the pivoting end of the curved finger 50 need not be made the same radius of curvature as the annular shoulder 56, or vice versa, since the pin 64 will ride on the fixed portion 48 to the position indicated by the numeral 64' of FIG. 5 rather than on the inner edge of the curved finger 50 as previously described.

While it will be apparent that the embodiments of the invention herein disclosed are well calculated to fulfill the objects of the invention, it will be appreciated that the invention is susceptible to modification, variations and change without departing from the proper scope or fair meaning of the subjoined claims.

What is claimed is:

1. In a spinning reel having a housing, a spool mounted on one end of said housing, a tubular body rotatably mounted on said housing and extending over said spool in coaxial alignment therewith and a finger mounted on said body to wind a fishing line on said spool, a drive mechanism embodying a first gear rotatably mounted in said housing and adapted to be rotated by a handle on the outside of the housing and a second gear fixed to said tubular body and driven by said first gear to rotate said body, a shaft slidably extending through said second gear and having one end fixed to said spool to reciprocate the spool relative to the housing when the shaft is reciprocated, said first gear rotating in a plane parallel to the axis of said shaft and having an eccentric radially inwardly presenting annular shoulder formed on the face thereof adjacent said shaft, pin means projecting from said shaft near the other end thereof and engaging said shoulder to reciprocate the shaft in response to the rotation of said first gear, and a spring-pressed finger pivoted on said first gear for movement to and from said annular shoulder, said spring-pressed finger riding over said pin in one direction of rotation of said first gear and picking up said pin and moving it away from the shoulder when said first gear is rotated in the opposite direction.

2. In a spinning reel for a fishing line, a housing, a reciprocable shaft in said housing, a spool on said shaft, a gear in said housing having an eccentric annular recess, a pin on said shaft extending into said recess, a hollow cylindrical body for receiving said spool rotatably mounted on said housing, a gear interconnecting said body and said first gear, a pickup finger for the fishing line supported on said body, a disk in said recess of less diameter than that of the recess, said disk having one-half of the periphery disposed on an arc scribed by a radius from the center thereof and the other half having a changing arc produced by the progressive shortening of said radius, a finger having an inner and outer surface converging to a point from an end having sufficient width to be pivoted to said disk, means for pivotally supporting the finger on the disk in a manner to have its outer surface travel over the pin when the gears are rotated in one direction and to have the inner surface engage the pin when rotated in the opposite direction, and means for rotating said gears.

3. The invention as defined in claim 2, including resilient means for normally urging the pin on said shaft against the periphery of said disk.

4. The invention as defined in claim 2, wherein said finger has the shape of a half crescent, and resilient means for biasing said finger away from said disk.

5. The invention as defined in claim 2, wherein the outer edge of said finger has substantially the same radius of curvature as the portion of the disk having the uniform radius, and wherein the inner edge of the finger follows the varying radius of the adjacent varying edge of the disk.

References Cited in the file of this patent

UNITED STATES PATENTS

| | | |
|---|---|---|
| 334,989 | Shellenberger | Jan. 26, 1886 |
| 2,546,465 | Martini | Mar. 27, 1951 |
| 2,687,855 | Shakespeare et al. | Aug. 31, 1954 |
| 2,799,457 | Martini | July 16, 1957 |
| 2,879,954 | Small | Mar. 31, 1959 |